(12) United States Patent
Andersson et al.

(10) Patent No.: US 10,385,751 B2
(45) Date of Patent: Aug. 20, 2019

(54) EXHAUST GAS WASTE HEAT RECOVERY SYSTEM

(71) Applicant: VOLVO TRUCK CORPORATION, Göteborg (SE)

(72) Inventors: Lennart Andersson, Varberg (SE); Arne Andersson, Mölnlycke (SE)

(73) Assignee: Volvo Truck Corporation, Göteborg (SE)

( * ) Notice: Subject to any disclaimer, the term of this patent is extended or adjusted under 35 U.S.C. 154(b) by 436 days.

(21) Appl. No.: 15/315,776

(22) PCT Filed: Jun. 26, 2014

(86) PCT No.: PCT/EP2014/001744
§ 371 (c)(1),
(2) Date: Dec. 2, 2016

(87) PCT Pub. No.: WO2015/197088
PCT Pub. Date: Dec. 30, 2015

(65) Prior Publication Data
US 2017/0130633 A1   May 11, 2017

(51) Int. Cl.
*F01N 3/02* (2006.01)
*F01N 3/20* (2006.01)
(Continued)

(52) U.S. Cl.
CPC .............. *F01N 5/02* (2013.01); *F01K 23/065* (2013.01); *F01N 3/021* (2013.01); *F01N 3/0205* (2013.01);
(Continued)

(58) Field of Classification Search
CPC ........ F02M 26/33; F02M 26/24; F02M 26/04; F02M 26/06; F02M 26/28; F02M 26/05;
(Continued)

(56) References Cited

U.S. PATENT DOCUMENTS 6,057,605 A * 5/2000 Bourne ................. B60K 6/485
290/40 C
8,752,378 B2 * 6/2014 Ernst ..................... F01K 23/065
60/286
(Continued)

FOREIGN PATENT DOCUMENTS

| EP | 2098696 A1 | 9/2009 |
|---|---|---|
| EP | 2280158 A2 | 2/2011 |
| EP | 2700794 A2 | 2/2014 |

OTHER PUBLICATIONS

International Searh Report (dated Jan. 5, 2015) for corresponding International App. PCT/EP2014/001744.

*Primary Examiner* — Phutthiwat Wongwian
*Assistant Examiner* — Edward Bushard
(74) *Attorney, Agent, or Firm* — WRB-IP LLP

(57) ABSTRACT

An exhaust gas arrangement includes an exhaust gas system for conveying an exhaust gas stream. The exhaust gas system includes a turbine and an exhaust gas treatment system. The exhaust gas arrangement further includes a working fluid circulation circuit connected to the exhaust gas system for recovery of energy from the exhaust gas stream. The working fluid circulation circuit includes a first heat exchanger which is arranged at a waste heat source for heat exchange between the waste heat source and a working fluid in the working fluid circulation circuit, and a second heat exchanger positioned in the exhaust gas system for heat exchange between the exhaust gas and the working fluid. The second heat exchanger is positioned downstream of the turbine and upstream of a particle filter in the exhaust gas treatment system. An internal combustion engine system and a vehicle including such an exhaust gas arrangement are also disclosed.

31 Claims, 4 Drawing Sheets

(51) Int. Cl.
*F01N 5/02* (2006.01)
*F02G 5/02* (2006.01)
*F02G 5/04* (2006.01)
*F01K 23/06* (2006.01)
*F01N 3/021* (2006.01)
*F02B 41/10* (2006.01)
*F01N 3/023* (2006.01)

(52) U.S. Cl.
CPC ......... *F01N 3/0234* (2013.01); *F01N 3/2066* (2013.01); *F01N 5/025* (2013.01); *F02B 41/10* (2013.01); *F02G 5/02* (2013.01); *F02G 5/04* (2013.01); *F01N 2240/02* (2013.01); *Y02A 50/2325* (2018.01); *Y02T 10/16* (2013.01); *Y02T 10/163* (2013.01); *Y02T 10/166* (2013.01); *Y02T 10/24* (2013.01)

(58) Field of Classification Search
CPC ............... F02M 31/205; F02B 29/0443; F02B 29/0493; F02B 37/00; F02D 23/00; F02D 2200/021; F02D 2200/0414; F02D 41/0007; F02D 41/0065; F02D 41/005; F02D 21/08; Y02T 10/146; Y02T 10/47; Y02T 10/144; Y02T 10/126; F01P 5/10; F01P 2060/02
USPC .......................................................... 60/616
See application file for complete search history.

(56) References Cited

U.S. PATENT DOCUMENTS

| | | | |
|---|---|---|---|
| 9,267,415 B2 * | 2/2016 | Myers | ........................ F01N 5/02 |
| 9,458,752 B2 * | 10/2016 | Carstensen | ............... F02G 5/02 |
| 2011/0088397 A1 * | 4/2011 | Mori | ..................... F01K 23/065 |
| | | | 60/661 |
| 2011/0209473 A1 | 9/2011 | Fritz et al. | |
| 2011/0265476 A1 * | 11/2011 | Berger | ................... F01K 13/02 |
| | | | 60/651 |
| 2014/0013743 A1 | 1/2014 | Dane | |

* cited by examiner

EXHAUST GAS WASTE HEAT RECOVERY SYSTEM

BACKGROUND AND SUMMARY

The present disclosure relates to an exhaust gas arrangement comprising an exhaust gas system for conveying an exhaust gas stream, wherein the exhaust gas system comprises a turbine and an exhaust gas treatment system, wherein the exhaust gas arrangement further comprises a working fluid circulation circuit connected to said exhaust gas system for recovery of energy from the exhaust gas stream, wherein the working fluid circulation circuit comprises a first heat exchanger which is arranged at a waste heat source for heat exchange between the waste heat source and a working fluid in the working fluid circulation circuit, and a second heat exchanger positioned in the exhaust gas system for heat exchange between the exhaust gas and the working fluid. An internal combustion engine system and a vehicle comprising such an exhaust gas arrangement are also disclosed.

From the prior art a plurality of exhaust gas arrangements are known. One of them is based on a Rankin cycle which may use waste heat of an internal combustion engine, e.g. an exhaust gas system, for heating a working fluid which in turn drives an expander engine for generating electric or mechanical energy. One known exhaust gas arrangement is disclosed in EP 2 098 696 A1.

The working fluid of an exhaust gas arrangement based on a Rankin cycle usually cycles through four stages. In a first stage the liquid working fluid is pumped from low to high pressure. In the subsequent stage, the high pressure liquid working fluid is heated, e.g. by an external heat source, and thereby converted into its gaseous phase. In the next stage, the gaseous phase working fluid expands in an expander engine, e.g. a displacement expander, such as a piston engine and/or a turbine. In its last stage, the working fluid is cooled down in a condensation device and converted back to its liquid phase.

Usually, in a vehicle, the expander engine may either be connected to a generator generating electric energy for driving an energy consumer, or to the drivetrain thereby acting as auxiliary power unit for the internal combustion engine in the vehicle.

The internal combustion engine (ICE) in turn may be operated in at least four main ICE operation modes. In the following, the term "ICE operation modes" is used as abbreviation of "internal combustion engine operation modes":

i. "High load ICE operation modes" are defined as ICE operation modes where the driving situation requires a lot of driving force, e.g. running uphill or accelerating.

ii. "Normal load ICE operation modes" are defined as ICE operation modes where the vehicle is neither substantially accelerating nor substantially decelerating, e.g. the vehicle is running at constant speed on a high way.

iii. "Low load ICE operation modes" are defined as ICE operation modes, where the vehicle requires little driving force, e.g. when the vehicle is running downhill, decelerates or is in motoring or idle engine operation modes (see further below).

iv. "No load ICE operation modes" are defined as ICE operation modes, where the internal combustion engine is stopped.

The above mentioned idle engine operation mode (see item iii) describes all ICE operation modes where the engine is running at idle speed. Idle speed is the rotational speed which the ICE runs on when the engine is decoupled from the drivetrain and the accelerator of the ICE is released. Usually, the rotational speed is measured in revolutions per minute (rpm) of the crankshaft of the ICE. At idle speed the ICE generates enough power to run reasonably smoothly and to operate accessory equipment (water pump alternator and other accessories such as a power steering), but usually not enough energy to perform substantial work such as propelling the vehicle. For vehicles, such as trucks or passenger cars, idle speed is customarily between 600 rpm and 1000 rpm. Even if the accelerator is released a certain amount of fuel is injected into the ICE in order to keep the ICE running. If the ICE is operating a large number of accessories or accessories requiring a lot of energy, particularly air conditioning, the idle speed is normally raised to ensure that the ICE generates enough power. Therefore, most engines have an automatic adjustment feature in the carburetor of the fuel injection system that raises the idle speed when more power is required.

The above mentioned motoring engine operation mode (item iii) is defined as the mode where the ICE is running above a certain rotational speed (rpm), but no fuel is injected into the ICE. One example of a motoring ICE operation mode is when the ICE is dragging, i.e. the vehicle which is normally driven by the ICE is coasting down a hill. During this mode the accelerator is also released, but the engine remains coupled to the drivetrain and the ICE is kept running by the drive fuse of the gearbox's main shaft.

In a vehicle comprising an exhaust gas arrangement based on a Rankin cycle, the different ICE operation modes constitute a problem since the energy generation and the energy distribution of the exhaust gas arrangement cannot be controlled. For an expander engine converting energy to the crankshaft of a vehicle this means e.g. there can be a large time lag before the expander engine gives full power when power is needed. It can also mean that the provision of additional propulsion energy may be unwanted in low load ICE operation modes, particularly when the vehicle is running downhill. If the exhaust gas arrangement acts as auxiliary power unit, such that it generates power to e.g. a battery, a lower efficiency may result, with the addition of cost for the generator, battery and other related pieces of equipment. It has therefore been suggested to control the volume of steam entering the expander engine by providing a bypass for the expander engine.

A further known problem during low load ICE operation modes is that the temperature of the exhaust gas of the ICE decreases significantly as the ICE more or less pumps fresh air at ambient temperature into the exhaust gas system. A heat exchanger arranged in the exhaust gas system for operating an exhaust gas arrangement decreases the exhaust gas temperature even further. This results in at least two disadvantages:

i. The temperature of the exhaust gas is not sufficient for vaporizing the working fluid, thereby rendering the exhaust gas arrangement inoperable.

ii. An optionally provided exhaust gas treatment system, which usually requires a working temperature between roughly 250° C. and 450° C., is cooled below its working temperature.

Consequently, after a long period of low load ICE operation mode, e.g. after a long downhill course, neither the exhaust gas arrangement, nor the exhaust gas treatment system are working properly.

In EP 2 098 696 A1 a second heat exchanger is arranged in the exhaust gas system upstream of the first heat exchanger which is located downstream of an exhaust gas treatment system. The second heat exchanger is located upstream of an SCR catalyst within the exhaust gas treatment system in order to lower the exhaust gas temperature to protect the SCR catalyst from superheating.

It is desirable to provide an exhaust gas arrangement which acts as auxiliary power unit for an internal combustion engine but which alleviates or at least reduces the above mentioned disadvantages of the prior art.

The present disclosure provides according to a first aspect an exhaust gas arrangement comprising an exhaust gas system for conveying an exhaust gas stream, wherein the exhaust gas system comprises a turbine and an exhaust gas treatment system. The exhaust gas arrangement further comprises a working fluid circulation circuit connected to the exhaust gas system for exchange of energy between the exhaust gas stream and a working fluid within the working fluid circulation circuit. The working fluid circulation circuit comprises a first heat exchanger which is arranged at a waste heat source for exchange of energy between the waste heat source and the working fluid, and a second heat exchanger positioned in the exhaust gas system for exchange of energy between the exhaust gas stream and the working fluid. The second heat exchanger is positioned downstream of the turbine and upstream of a particle filter in the exhaust gas treatment system.

Positioning of a second heat exchanger downstream of the turbine and upstream of the particle filter in the exhaust gas treatment system may be used for keeping particle filter in the exhaust gas treatment system within its favoured operating temperature range. This enables that the exhaust gas stream out of the exhaust gas treatment system may be used for not only cooling the exhaust gas stream before entering the particle filter, but also for heating the exhaust gas stream upstream of the particle filter. The particle filter may consequently not only be protected from superheating, but also from being too cold such that regeneration thereof is limited or even made impossible. When the second heat exchanger is used for cooling the exhaust gas stream it is made to further heat the working fluid which first has passed through the first heat exchanger where it may recover energy from the waste heat source. The working fluid may this way even become superheated and used for additional power recovery. When the second heat exchanger is used for heating the exhaust gas stream it is made to cool the working fluid which first has passed through the first heat exchanger where it may recover energy from the waste heat source. In this case any regeneration of the particle filter can be achieved quicker. The second heat exchanger may consequently be used both for heating and for cooling of the exhaust gas stream, such that optimal, or nearly optimal operating conditions may be established for the particle filter and possibly any other features located downstream of the second heat exchanger.

According to an embodiment the second heat exchanger is positioned upstream of any part of the exhaust gas treatment system. Hereby the temperature of the passing exhaust gas stream may be adapted to any part of the exhaust gas treatment system for better performance.

According to an embodiment the waste heat source is any external or internal waste heat source. An external heat source of the exhaust gas arrangement may e.g. be an internal combustion engine to which the exhaust gas arrangement is connected, or an exhaust gas recirculation conduit in the internal combustion engine.

According to an embodiment the internal waste heat source may e.g. be exhaust gas treatment system. The exhaust gas stream may contain more energy in the form of heat than has been recovered in the second heat exchanger and this energy may be used as source for the heat exchange in the first heat exchanger.

According to an embodiment the second heat exchanger is positioned upstream of the first heat exchanger. Hereby the second heat exchanger meets the exhaust gas stream first.

According to an embodiment the first heat exchanger is positioned downstream of an SCR catalyst in the exhaust gas treatment system. The temperature of the SCR catalyst is hence not affected by the heat exchange within the first heat exchanger which may be mainly aimed for recovering heat from the exhaust gas stream such that the exhaust gas stream downstream thereof is cooled down.

According to an embodiment the first heat exchanger is positioned downstream of any part of the exhaust gas treatment system. Parts of the exhaust gas treatment system may be negatively affected if the first heat exchanger is positioned upstream thereof, since their efficiency may depend on a particular temperature interval. Hence it is advantageous to position the first heat exchanger downstream of any part of the exhaust gas treatment system.

According to an embodiment the working fluid circulation circuit comprises an expander engine arranged downstream of the first heat exchanger. One exemplary embodiment of an expander engine is a turbine. An expander engine may be used to recover energy from the working fluid.

According to an embodiment a bypass passage is arranged in the working fluid circulation circuit for bypassing the expander engine, the bypass passage being branched off downstream of the first heat exchanger and is being reconnected to the working fluid circulation circuit downstream of the expander engine. This way expansion of the working fluid and consequently no addition of energy to the expander engine will take place. There may be periods when such addition of energy to the expander engine, and possibly to any other parts to which the exhaust gas arrangement is coupled, such as an internal combustion engine, is contra productive. Such periods may be the earlier defined low load ICE operation modes.

According to an embodiment the bypass passage is branched off upstream of the second heat exchanger. The bypass passage together with the second heat exchanger has a plurality of advantages, e.g.:

i. During low load ICE operation modes, the bypass passage enables the working fluid to bypass the expander engine so that the expander engine is not operated and no additional power is provided to i.e. a drivetrain.

ii. During low load ICE operation modes, the heat of the working fluid may be exchanged to the exhaust gas stream by means of the second heat exchanger in combination with the bypass passage so that the particle filter and an optionally provided exhaust gas treatment system may be kept within its working temperature range by the heated exhaust gas stream.

iii. During high load ICE engine operation modes in turn, the second heat exchanger may be used for superheating the working fluid, whereby the energy exploit of the exhaust gas arrangement may be increased.

According to an embodiment the working fluid circulation circuit further comprises a condensation device arranged downstream of the expander engine for condensing the working fluid, and a first pump for circulating the working fluid. Advantageously, the exhaust gas arrangement is based on a Rankin cycle. Thus, the exhaust gas arrangement may further comprise a condensation device for cooling and thus converting the gaseous working fluid into its liquid phase, and a first pump for circulating the working fluid.

According to an embodiment the first pump is arranged downstream of the condensation device. Pumping a liquid to high pressure is easier relatively seen than compressing a gas to similar pressure. Also, when the liquid is cooled to well below boiling temperatures the pump may be of relative simple design.

According to an embodiment the bypass passage is reconnected to the working fluid circulation circuit either upstream or downstream of the condensation device.

When the bypass passage is reconnected to the working fluid circulation circuit upstream of the condensation device and since the working fluid streaming through the bypass passage may be at least partly in its gaseous phase, the condensation device ensures that also the gaseous phase part of the bypassed working fluid is condensed into its liquid phase so that the pump is not destroyed by cavitation. The bypass passage may also be reconnected to the working fluid circulation circuit downstream of the condensation device such that, particularly, it is ensured that the working fluid in the bypass passage is in its liquid phase.

According to an embodiment when the bypass passage is reconnected to the working fluid circulation circuit downstream of the condensation device the bypass passage is reconnected to the working fluid circulation circuit downstream of the first pump. This way the first pump does not need to be dimensioned for the higher flow which is the result from utilising a liquid for heat transport in the heat exchange in the exhaust gas arrangement.

According to an embodiment a second pump is arranged in the bypass passage downstream of the second heat exchanger. This way the first pump does not need to be dimensioned for the higher flow which is the result from utilising a liquid for heat transport in the heat exchange in the exhaust gas arrangement. The pumping effect may instead be accomplished by the second pump.

According to an embodiment a first valve is arranged in the working fluid circulation circuit downstream of the branch off of by the bypass passage and upstream of the expander engine for opening and/or closing the connection to the expander engine, and/or a second valve is arranged in the bypass passage for opening and/or closing the bypass passage.

According to an embodiment the bypass passage is split into at least a first branch and a second branch, wherein the first branch is arranged to reconnect the working fluid circulation circuit downstream of the expander engine, and the second branch is adapted to reconnect the working fluid circulation circuit upstream of the expander engine. There may be several reasons and advantages for doing so. During heavy engine braking the exhaust gases will become hot and there may be a lot of gas phase working fluid which is preferably not run through the expander engine. It may also be advantageous to bypass the exhaust gas after treatment system for regeneration of parts thereof. Furthermore, there are different expander engine types and these can endure different amounts of liquid droplets. When the expander engine demands superheated steam for proper function and to guarantee a working fluid free from liquid, the working fluid should preferably be superheated in the first heat exchanger and to some extent be made to bypass the second heat exchanger to separate some condensate downstream of the second heat exchanger to mix superheated steam with steam upstream of the expander engine.

According to an embodiment the second valve is arranged in the first branch for opening and/or closing the first branch, and a third valve is arranged in the second branch for opening and/or closing the second branch.

According to an embodiment the first and/or the second and/or the third valve is/are an on/off valve. An on/off valve is easily controlled and robust.

According to an embodiment the first valve is a normally open valve and/or the second and/or third valve is/are a normally closed valve. This ensures that even if one or several of the valves are inoperable, e.g. due to a broken valve controller, the expander engine and thereby the exhaust gas arrangement may still be operated.

According to an embodiment the bypass passage further comprises a separator arranged downstream of the second heat exchanger for separating the working fluid streaming through the bypass passage into a first stream of preferably liquid working fluid and a second stream of preferably gaseous working fluid. The first branch may reconnect the working fluid circulation circuit downstream of the expander engine, and the second branch may reconnect the working fluid circulation circuit upstream of the expander engine. As mentioned above, the second heat exchanger may also be used for superheating the working fluid, particularly during high load ICE operation modes. For the advantageously increased exploit of thermal energy, the superheated working fluid needs to be fed to the expander engine, which is done by the arrangement of the second branch.

According to an embodiment the separator is arranged at the location where the bypass passage branches into the first and second branch, so that the first stream of working fluid is guided through the first branch and the second stream of working fluid is guided through the second branch. It is thereby ensured that the gaseous working fluid drives the expander engine, wherein the liquid working fluid may stream to the cool side of the exhaust gas arrangement. In this arrangement, the bypass passage, or more precisely, the first branch of the bypass passage may also be reconnected downstream of the condensation device. Since only liquid working fluid streams through the first branch to the pump, cavitation may be avoided. It goes without saying that the first branch of the bypass passage may be reconnected downstream of the pump and may comprise its own second pump.

According to an embodiment the expander engine is adapted to be drivingly connected to a drivetrain of a vehicle for providing auxiliary power thereto in order to lower any fuel consumption of the vehicle. An exemplary embodiment of such connection between the expander engine and the drivetrain is through a gear set.

According to an embodiment the expander engine is adapted to be drivingly connected to a generator of a vehicle in order to provide electric power to accessories of the vehicle. Such accessories may e.g. be an electric motor for hybrid operation of the vehicle, other power using devices in or around the vehicle.

According to an embodiment the arrangement further comprises a thermoelectric element for generating electric energy for driving a consumer, wherein the thermoelectric element comprises a thermoelectric material having a first side and a second side, wherein for generating electric energy, the temperature of the first side is adapted to differ from the temperature of second side, and/or wherein by supplying electric energy to the thermoelectric element, the temperature of the first side differs from the temperature of the second side. The first side vision heatable and the second side is kept at a lower temperature, e.g. is cooled by a cooler, the condensation device and/or simply by the cool working fluid of the working fluid circuit. The induced temperature difference between the first and second side may then generate, in the known way, an electric current in the thermoelectric material which can be used e.g. for driving an accessory equipment.

Thereby, the generation of electric energy is based on the so-called Seebeck effect which governs the conversion of a temperature difference directly into electric energy according to the formula:

$$V = \int_{T_1}^{T_2} (S_B(T) - S_A(T)) dT,$$

wherein V is the voltage, SA and SB are the so-called Seebeck coefficients of material A and material B, and T-i is the temperature of the material on the first side and T2 the temperature of the material on the second side.

Besides the generation of electric energy it is also possible to supply electric energy to the thermoelectric element. Then, the thermoelectric element functions as heater on its one side and cooler on its other side. This effect is the so-called Peltier effect stating: When a current is made to flow through a thermoelectric material composed of materials A and B, heat is generated at one side T2, and absorbed at the other side at T^. The Peltier heat absorbed by the other side per unit time is equal to $$\dot{Q} = \Pi_{AB} I = (\Pi_B - \Pi_A) I,$$

where ΠAB is the Peltier coefficient for the thermoelectric material composed of materials A and B and ΠA(ΠB) is the Peltier coefficient of material A (B). Π varies with the material's temperature and its specific composition:

The principle of an exhaust gas arrangement using a thermoelectric material is outlined e.g. in WO 2011/011795.

Consequently, the provision of a thermoelectric material in the exhaust gas arrangement has several advantages:

i. The expander engine provides mechanical work to the drivetrain while the thermoelectric material provides electric energy to accessories.

ii. Provision of the thermoelectric material in the condensation device of a Rankin cycle may utilize waste heat from the Rankin cycle.

iii. Provision of the thermoelectric material in at least one heat exchanger increases the total heat recovery, since the working fluid is heated by the waste heat of the thermodynamic material.

iv. When an external electric power source is connected to the thermoelectric material the thermoelectric material may be used as heater and/or cooler for the working fluid resp. the exhaust gas stream.

According to an embodiment the first side is arranged in heat exchanging connection to the waste heat source.

According to an embodiment the second side is arranged in heat exchanging connection to the working fluid circulation circuit.

According to an embodiment the thermoelectric material is arranged in at least one of the heat exchangers, e.g. in the first and/or second heat exchanger.

According to an embodiment the thermoelectric material is arranged in the condensation device.

According to an embodiment the thermoelectric element is adapted to be powered by an external electric energy source. Additionally, the thermoelectric material may be adapted to be powered by a battery or by an alternator during a cold start of the engine. Thereby, the thermoelectric material may be used as heater, which transfers heat from the working fluid to the exhaust gas stream and further on to the exhaust gas treatment system. Consequently, the exhaust gas treatment system may be heated up quickly to a working temperature for an efficient emission reduction.

Additionally or alternatively, the thermoelectric material may be powered by a battery or directly from an alternator during a cold start of the engine in such way that heat is transferred from the exhaust gas stream to the working fluid. Thereby, extra power may be provided to the drivetrain of the vehicle, even if all heat from the exhaust gas is already used for heating the exhaust gas treatment system.

As soon as the exhaust gas treatment system has reached its desired working temperature, the thermoelectric material may be switched from the heater mode to the generator mode by terminating the electric power supply. Then, the thermoelectric material itself produces electric energy for driving accessories by converting heat from the exhaust gas into electric energy.

According to a further embodiment the thermoelectric material may be powered by the battery or the alternator when the internal combustion engine is in low or no load ICE operation mode. Thereby the exhaust gas stream may be heated in order to avoid cooling down of the exhaust gas treatment system. Advantageously, in case the thermoelectric material is powered by the alternator of the internal combustion engine, e.g. during a downhill drive, the powering of the thermoelectric material may act as an auxiliary brake for the vehicle.

According to a second aspect of the disclosure an internal combustion engine system is disclosed, comprising an internal combustion engine and an exhaust gas arrangement of a kind according to any one or a combination of the embodiments of the first aspect of the disclosure.

According to a third aspect of the disclosure a vehicle is disclosed, comprising an exhaust gas arrangement of a kind according to any one or a combination of the embodiments of the first aspect of the disclosure, or an internal combustion engine system of a kind according to any one or a combination of the embodiments of the second aspect of the disclosure.

Further advantages and embodiments are defined in the description, the figures and the appended claims.

BRIEF DESCRIPTION OF THE DRAWINGS

In the following, the principle of the disclosure will be described in more detail with assistance from the attached figures. It should be noted that the figures show different embodiments and are not intended to define the scope of protection, which is defined by the appended claims only. The figures show:

DETAILED DESCRIPTION

Figure 1A:
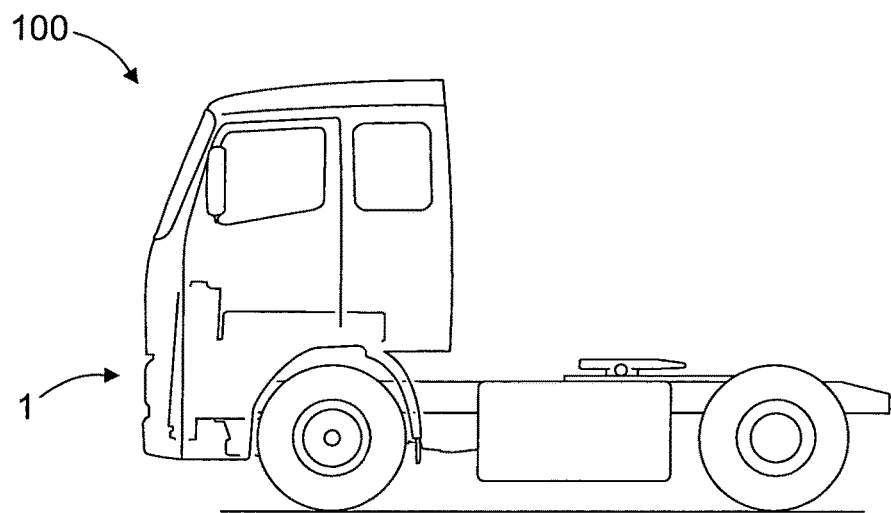
FIG. 1a a schematic illustration of a vehicle being provided with an embodiment of the present disclosure.

In the following, same or similar functioning parts are indicated with the same reference numerals.

FIG. 1a discloses a vehicle 100 which is provided with an exhaust arrangement 1 according to any one of the embodiments disclosed herein. The vehicle 100 may be like in the figure a heavy duty vehicle, but may well also be of any kind for which the disclosed exhaust arrangement 1 is advantageous. Such vehicles may include passenger cars, busses and other types of duty vehicles.

FIG. 1b to FIG. 7 show different embodiments of the present disclosure. In the depicted embodiments, the exhaust arrangement 1 uses waste heat of an internal combustion engine 12 for heating a working fluid streaming through a working fluid circulation circuit 11.

Figure 1B:
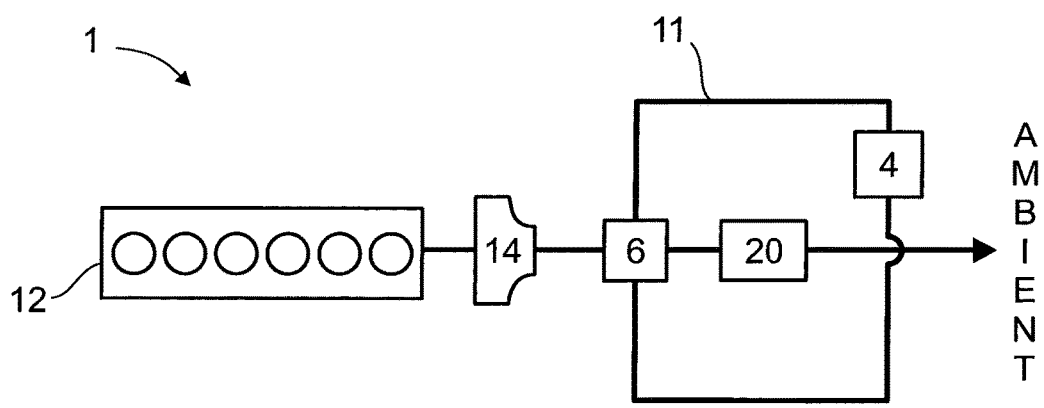
FIG. 1b a schematic illustration of a first embodiment of the present disclosure.

FIG. 1b discloses an exhaust gas arrangement 1 comprising a first heat exchanger 4 and a second heat exchanger 6 which are interconnected by a working fluid circulation circuit 11. An internal combustion engine 12, which is not part of the exhaust gas arrangement 1 is coupled to an exhaust gas system 16 which comprises a turbine 14 and an exhaust gas treatment system 20. The exhaust gas treatment system comprises a particulate filter. The exhaust gas system 16 is arranged to transport an exhaust gas stream from the internal combustion engine 12 to the ambient. When doing so the exhaust gas stream first meets the second heat exchanger 6 and then passes through the particulate filter before passing out to the ambient. The working fluid circulation circuit 11 contains a working fluid which is arranged to either extract energy from or deliver energy to the exhaust gas stream in the second heat exchanger. The first heat exchanger is arranged to extract energy from a waste heat source.

Figure 2:
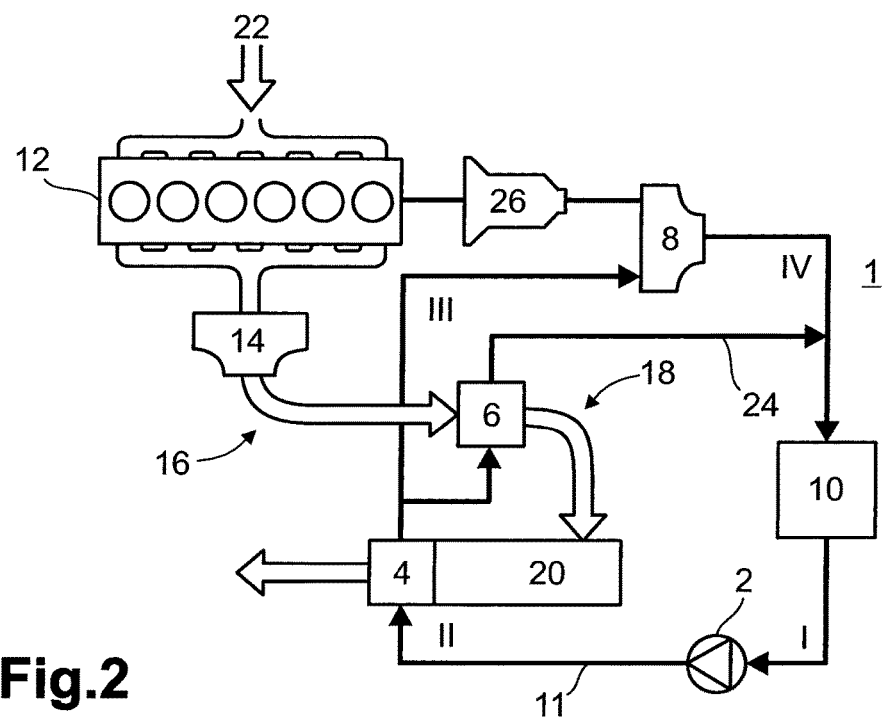
FIG. 2 a schematic illustration of a second embodiment of the present disclosure.

Referring to FIG. 2, the exhaust gas arrangement 1 comprises a pump 2, the first heat exchanger 4, the second heat exchanger 6, an expander engine 8 and a condensation device 10, which are interconnected by the working fluid circulation circuit 11. The first heat exchanger 4 is in heat exchanging connection to the exhaust gas system 16 of the internal combustion engine 12. The exhaust gas system 16 comprises the turbine 14, the exhaust gas duct 18, and an exhaust gas treatment system 20. The exhaust gas treatment system 20 comprises the particulate filter of FIG. 1. Further, the internal combustion engine 12 comprises a gas intake side 22, where fuel and air are mixed in the known way and fed to the internal combustion engine 12.

As further depicted, expander engine 8 acts as an auxiliary power unit for the internal combustion engine 12 and is connected to a drivetrain 26 of a vehicle, in which the internal combustion engine 12 and the exhaust gas arrangement 1 are utilised, in addition to the internal combustion engine 12. In this way the thermal energy of the waste heat of the exhaust gas may be used for supporting the internal combustion engine 12, whereby more power can be provided to the drivetrain of the vehicle, even if no additional fuel is injected into the internal combustion engine 12. Thereby, fuel and costs may be saved. It should be noted that in this embodiment both the second heat exchanger 6 as well as the first heat exchanger 4 are connected to the exhaust gas system 16 and the exhaust gas duct 18. Hence according to this embodiment, the waste heat source is embodied by the heat in the exhaust gas stream.

The exhaust gas arrangement 1 may further comprise a bypass passage 24 at which the second heat exchanger 6 is arranged. The second heat exchanger 6 is in heat exchanging connection with the exhaust gas system 16 of the internal combustion engine 12. As can be seen in this figure, the first heat exchanger 4 and the second heat exchanger 6 are arranged upstream (second heat exchanger 6) and downstream (first heat exchanger 4) of the exhaust gas treatment system 20. In other words, the second heat exchanger is in this embodiment located upstream of any parts of the exhaust gas treatment system 20. The advantage of this arrangement will be explained in detail below.

It should be noted that the exhaust gas treatment system 20 according to the disclosure herein may comprise not only a particle filter, but also an SCR catalyst, an oxidation catalyst, a NOx trap or any other part that might for a useful contribution to the system. The exhaust gas treatment system 20 may comprise one or several of these parts in any order found appropriate.

As illustrated in FIG. 2, it is also possible to use the waste heat of an EGR engine 12a (internal combustion engine with Exhaust Gas Recirculation) for providing hot working fluid for the Rankin cycle embodied herein. The details will also be explained below.

FIGS. 4 to 7 further depict that the bypass passage 24 may be split into at least a first branch 28 and a second branch 30. The first branch 28 may reconnect the working fluid circulation circuit 11 downstream of the expander engine 8. The second branch 30 may reconnect the working fluid circulation circuit 1 upstream of the expander engine 8. By providing a bypass passage 24 having a first branch 28 and a second branch 30, the exhaust gas arrangement 1 may be operated in four different main operation modes. For distinction from the ICE operation modes, the heat recovery assembly operation modes are abbreviated as HRC operation modes:

iv. "Normal HRC operation mode": the working fluid is heated by heat exchanger 4 to its gaseous phase and guided to the expander engine 8 where the thermal energy is converted into mechanical energy.

v. "Bypass HRC operation mode": the working fluid heated by the first heat exchanger 4 is guided through the bypass passage 24 and optionally through a first branch 28 leaving the expander engine 8 inoperable, vi. "Low load HRC operation mode": the working fluid is heated by the first heat exchanger 4 and guided through the bypass passage 24. The second heat exchanger 6 heats the exhaust gas stream and consequently an optionally arranged exhaust gas treatment system 20. Further on, the working fluid is guided through the first branch 28. The expander engine 8 is not operated. vii. "High load HRC operation mode": the working fluid heated by the first heat exchanger 4 is guided through the bypass passage 24, superheated by the second heat exchanger 6 and guided through the second branch 28 to the expander engine 8, thereby providing maximum auxiliary power.

The exhaust gas treatment system 20 and the first heat exchanger 4 may be integrated into a single device, but it is also possible that the first heat exchanger 4 and the exhaust gas treatment system 20 are separate units.

Arranging the first heat exchanger 4 downstream of the exhaust gas treatment system 20, has the advantage that the exhaust gas stream of the internal combustion engine 12 is not cooled before it reaches the exhaust gas treatment system 20. Thereby, the exhaust gas treatment system 20 may be kept within its working temperature range even during low load ICE operation modes.

Even if not shown in the any one of the figures, it should be explicitly mentioned that instead of using the waste heat of the exhaust gas stream of the internal combustion engine 12 and 12a also the heat of a coolant for the internal combustion engine 12 can be used as waste heat source for the exhaust gas arrangement 1. Moreover, it is also possible that at least one of the heat exchangers 4, 6 is arranged at an exhaust gas recirculation duct of an internal combustion engine with exhaust gas recirculation, like in FIG. 3.

The depicted exhaust gas arrangement 1 is based on a Rankin cycle and has at least four stages. In the first stage I, upstream of pump 2, the working fluid of the exhaust gas arrangement 1 is in its liquid phase and has a pressure around ambient air pressure. In a second stage 11, downstream of the pump 2, the working fluid is still in its liquid phase but is pressurized to a predetermined pressure by pump 2. In the subsequent stage III downstream of the first and second heat exchangers 4, 6, the working fluid has been transferred into its gaseous phase and is pressurized to a predetermined pressure above ambient air pressure. In its fourth stage IV downstream of expander engine 8, the working fluid is still in its gaseous phase, but has a pressure around ambient air pressure.

In the depicted exhaust gas arrangement 1, the expander engine 8, is connected to the drive train 26 of the vehicle. Consequently, the expander engine 8 is adapted to convert the thermal energy of the working fluid to mechanical or electrical energy. Mechanical energy can be created by e.g. a displacement engine, such as a piston engine, and may be used e.g. for driving a crankshaft of the drivetrain of the vehicle. The pressure of the working fluid is thereby used for displacing e.g. the piston or for operating the turbine.

The working fluid for such an exhaust gas arrangement 1 can be a pure liquid e.g. water or ethanol or ammonia, or a mixture of e.g. water with e.g. ammonia or ethanol, or even a water/ammonia/ethanol mixture.

Particularly, for the application in a vehicle, the use of ammonia is further advantageous as ammonia or an ammonia compound, namely urea, may already be present in the vehicle. In case the exhaust gas treatment system 20 uses a selective catalytic reduction unit (SCR catalyst) for reducing NOx compounds in the exhaust gas, urea or ammonia may be used as reduction agent.

To the different, non-limiting, embodiments in detail:

As can be seen in FIG. 2, the exhaust gas arrangement 1 has a working fluid circulation circuit 11, which connects the pump 2, the first heat exchanger 4, the expander engine 8 and the condensation device 10. The exhaust gas arrangement 1 further comprises the bypass passage 24 with the second heat exchanger 6. Both the first and the second heat exchangers 4 and 6 are arranged at the exhaust gas system 16 of the internal combustion engine 12, wherein the first heat exchanger 4 is arranged downstream the exhaust gas treatment system 20 and the second heat exchanger 6 is arranged upstream of the exhaust gas treatment system 20 and downstream of the turbine 14. The expander engine 8 is connected to the drivetrain 26 of a vehicle.

Figure 3:
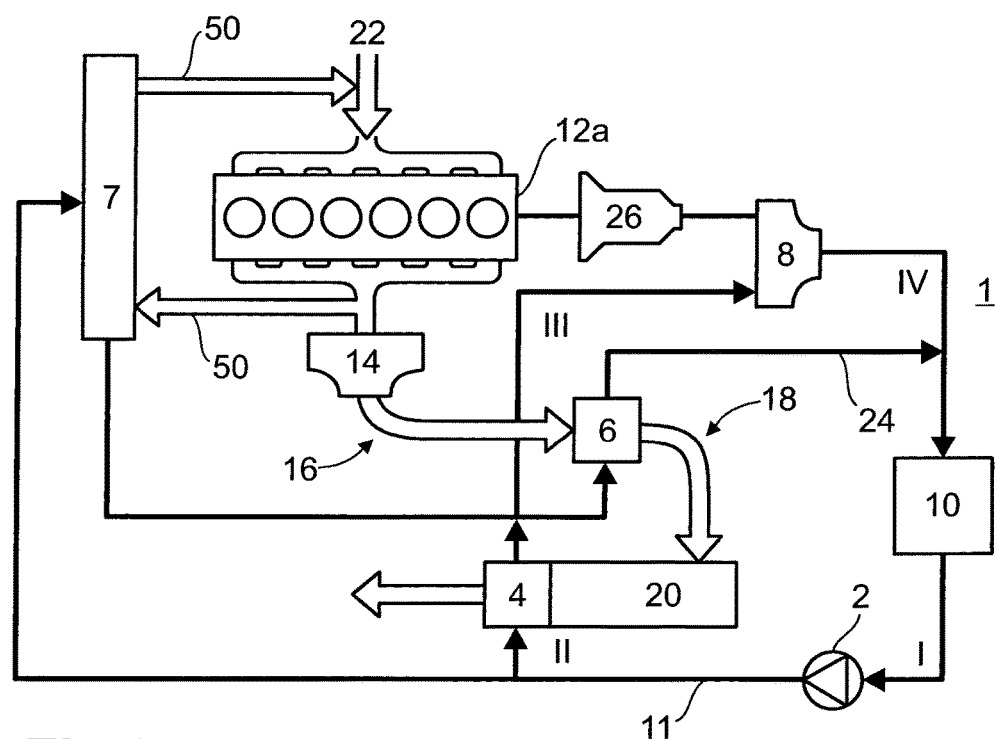
FIG. 3 a schematic illustration of a third embodiment of the present disclosure.

Instead of the ordinary internal combustion engine 12, as depicted e.g. in FIGS. 1b and 2, also an internal combustion engine with exhaust gas recirculation (EGR engine) may be used (see FIG. 3). In the depicted EGR engine 12a at least part of the exhaust gas is branched off upstream of the turbine 14 and is recirculated to the gas intake 22 (see EGR duct 50). Since the exhaust gas is branched off upstream of the turbine 14, the temperature of the exhaust gas is very high. In order not to damage the EGR engine 12a by taking in too hot exhaust gases at the gas intake 22, the recirculated exhaust gas is cooled. The cooling process can at least be supported by a further heat exchanger 7, which in turn may also be in heat exchanging connection with the working fluid circulation circuit 11 through the EGR duct 50. To further emphasise the cooling effect in the further heat exchanger 7, the working fluid circulation circuit 11 may, as is depicted in the figure, be branched off at a location downstream of the pump 2 and upstream of the first heat exchanger 4, such that this branch is lead to the further heat exchanger 7. This branch may consequently lead relatively seen cool working fluid to the further heat exchanger 7 to cool the EGR circuit comprising the internal combustion engine 12a, the EGR duct 50 and the further heat exchanger 7 down. Thereby, also the further heat exchanger 7 may utilise heat from the exhaust gas stream for heating the working fluid of the Rankin cycle.

The exhaust gas arrangement 1 as illustrated in FIG. 3 may have at least three heat exchangers 4, 6, and 7, where a heat transfer from the exhaust gas stream to the working fluid is enabled downstream of the exhaust gas treatment system 20, at the EGR duct 50 and the bypass passage 24. Besides the illustrated embodiment, it goes without saying that further heat exchangers may be arranged at other locations in the exhaust gas arrangement 1.

In the embodiments of FIGS. 2 and 3, and to some extent also for the FIG. 1b embodiment, the bypass passage 24 is depicted which is working as follows: During ordinary power requirements, the first heat exchanger 4 and possibly also the further heat exchanger 7 used in the FIG. 3 embodiment is used for heating the working fluid circulation circuit 1 and thereby supplying the expander engine 8 with gaseous working fluid. The working fluid streams from the first and further heat exchangers 4, 7 to the expander engine 8, directly. During low load HRC operation modes, the working fluid may bypass the expander engine 8 through the bypass passage 24. Thereby, it is ensured that during low load ICE operation modes, the dragging of the internal combustion engine 12 is not additionally supported by the expander engine 8. The second heat exchanger 6, which is arranged upstream of the exhaust gas treatment system 20, allows the cool exhaust gas stream resulting from the low load ICE operation mode to be heated to a suitable working temperature using heat from the working fluid which has been previously heated by the first and further heat exchangers 4, 7.

Moreover, during low load ICE operation modes, e.g. during a downhill drive, the internal combustion engine is not burning any fuel and therefore pumps fresh air at an ambient temperature through the exhaust gas system 16. Even in internal combustion engines 12 without turbocharger, the fresh air quite rapidly cools down the exhaust gas treatment system 20 below its operating temperature. This effect is even amplified by the turbine 14 of a turbocharger, due to the expansion in the turbine 14.

When the internal combustion engine 12 enters the low load ICE operation modes, the exhaust gas treatment system 20 is still within its working temperature range, so that hot exhaust gas stream is leaving the exhaust gas treatment system 20. Consequently, the first heat exchanger 4 still vaporizes the working fluid. The gaseous working fluid is then guided through the bypass passage 24 so that the hot exhaust gas stream from the exhaust gas treatment system 20 is condensed in the second heat exchanger 6, thereby heating the cool exhaust gas upstream of the exhaust gas treatment system 20.

In this way, the exhaust gas treatment system 20 is not cooled down below its working temperature, so that the exhaust gas treatment system 20 remains ready for working even after a low load ICE operation mode situation. Additionally, the hot exhaust gas treatment system 20 ensures that also the exhaust gas arrangement 1 is quickly back to its operating mode for providing auxiliary power to the internal combustion engine 12.

During high load ICE operation modes, where a lot of driving force is required, e.g. when the vehicle is accelerating or driving uphill, very hot exhaust gas is produced. This hot exhaust gas might even exceed the working temperature range of the exhaust gas treatment system 20. The heat exchangers 4, 6, and possibly also 7 may then be used as coolers for the exhaust gas for ensuring that the exhaust gas treatment system 20 remains in its preferred working temperature range Additionally, this opens up the possibility to exploit the high temperatures also in the Rankin cycle, e.g. by producing superheated working fluid, which in turn may be used of generating additional auxiliary energy.

Figure 4:
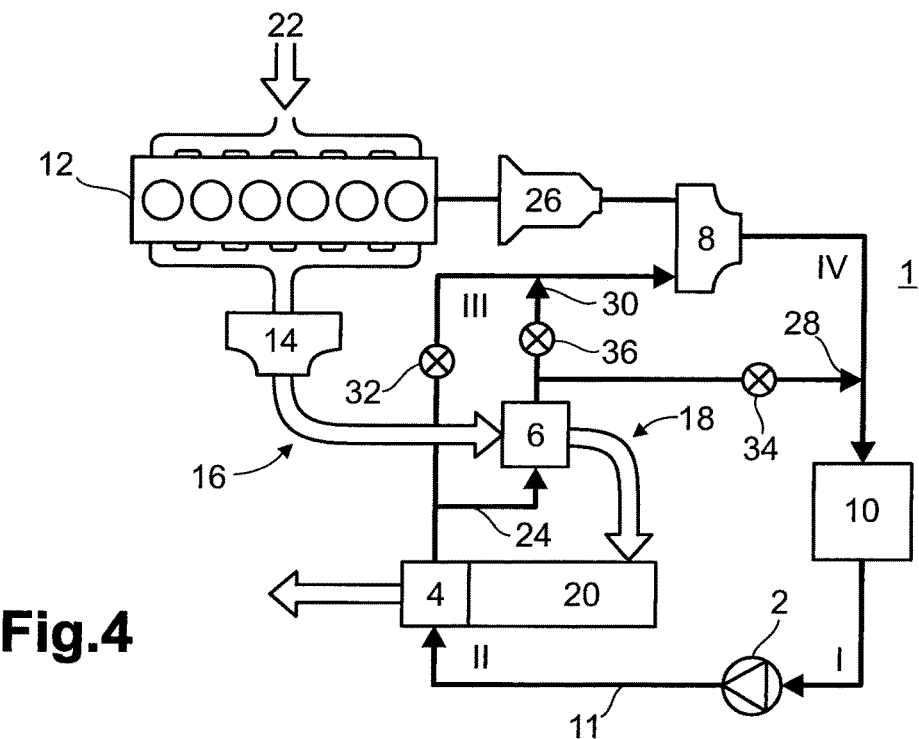
FIG. 4 a schematic illustration of a fourth embodiment of the present disclosure.

Superheated working fluid may be provided by using an arrangement as illustrated in FIG. 4. The depicted exhaust gas arrangement 1 may have a bypass passage 24, which is split into a first branch 28 and a second branch 30. The first branch 28 preferably reconnects to the working fluid circulation circuit 11 downstream of the expander engine 8. The second branch 30 reconnects the working fluid circulation circuit 11 upstream of expander engine 8.

For opening and closing the standard working fluid circulation circuit 11, the first branch 28 and the second branch 30 comprise valves 32, 34, and 36, which are arranged in the normal working fluid circulation circuit 11, the first branch 28 and the second branch 30, respectively. The valves 32, 34 and 36 are preferably on/off valves which are easily controlled and are very robust. Thereby, it is advantageous if the valve 32, arranged in the working fluid circulation circuit 11 is normally open, while the valves 34 and 36 arranged in the first 28 and second 30 branch, respectively, are normally closed. Thereby, it is ensured that even if the valves 32, 34, 36 are inoperable, the expander engine 8 is still operated.

The depicted embodiment works as follows: During high load ICE operation modes, the working fluid is adapted to stream through the second branch 30, e.g. by opening valve 36 and closing valves 32 and 34. Since the temperature of the exhaust gas stream exceeds the temperature of the working fluid preheated by the first heat exchanger 4, the second heat exchanger 6 serves as heater for the working fluid.

Thereby, the working fluid is superheated. The thermal energy of the superheated working fluid is then exploited in the expander engine 8, providing additional power for the drivetrain of the vehicle.

During low load ICE operation modes, the working fluid is adapted to stream through the first branch 28, e.g. by opening valve 34 and closing valves 32 and 36. Since during low load ICE operation modes, the temperature of the exhaust gas stream is significantly lower than the temperature of the working fluid preheated by the first beat exchanger 4, the working fluid is condensed in the second heat exchanger 6 and the exhaust gas stream is heated nearly to the temperature of the exhaust gas treatment system 20. Since liquid working fluid bypasses the expander engine 8 through the first branch 28 of the bypass passage 24, the first branch 28 may reconnect the working fluid circulation circuit 11 upstream or downstream of condensation device 10.

Connecting the first branch 28 upstream of condensation device 10, as shown in FIG. 4, has the further advantage that in case the working fluid 11 is not completely cooled down to its liquid phase, the condensation device 10 ensures the liquid phase. The presence of a mixture of a gaseous phase and liquid phase in the working fluid downstream of the second heat exchanger 6 is likely to happen at the beginning of low load ICE operation modes when the exhaust stream gas in exhaust gas duct 18 has not been cooled down enough.

The presence of gaseous working fluid, downstream of condensation device 10 in turn, may cause cavitation in the first pump 2, which may cause damage to the pump and should be avoided.

Figure 5:
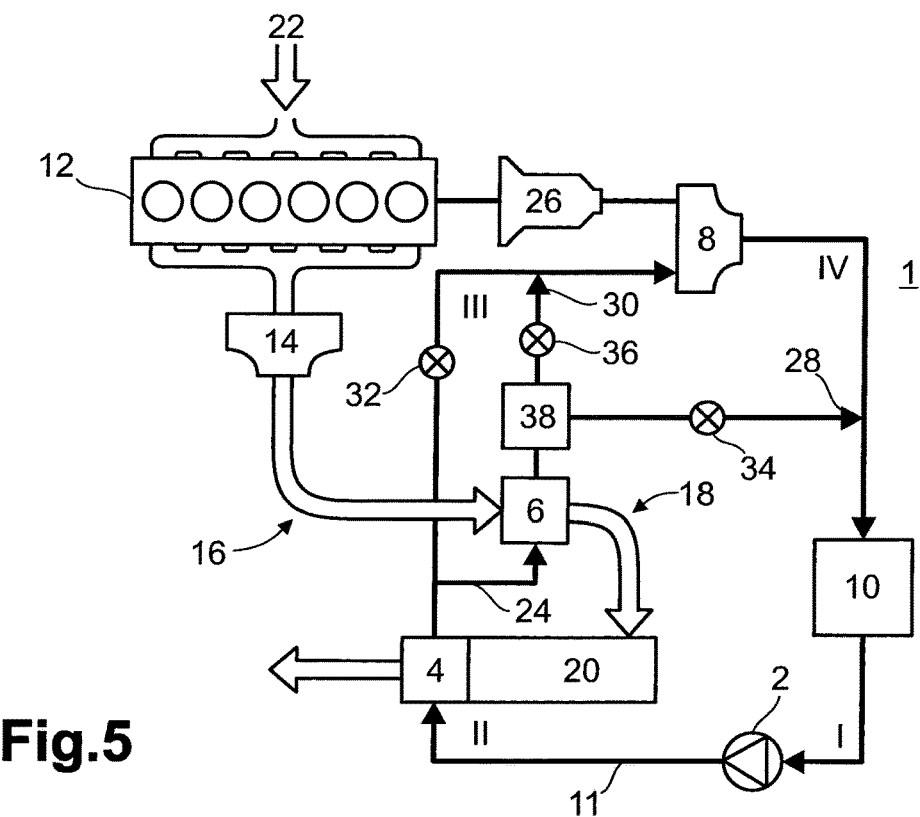
FIG. 5 a schematic illustration of a fifth embodiment of the present disclosure.

To ensure that no gaseous working fluid is guided through the first branch 28, it is further possible to arrange a separator 38 downstream of the second heat exchanger 6, which separates the liquid working fluid and the gaseous phase working fluid. The liquid working fluid is then guided through the first branch 28, wherein the gaseous working fluid is guided through the second branch 30 to the expander engine 8. An embodiment having a separator 38 is depicted in FIG. 5.

Figure 6:
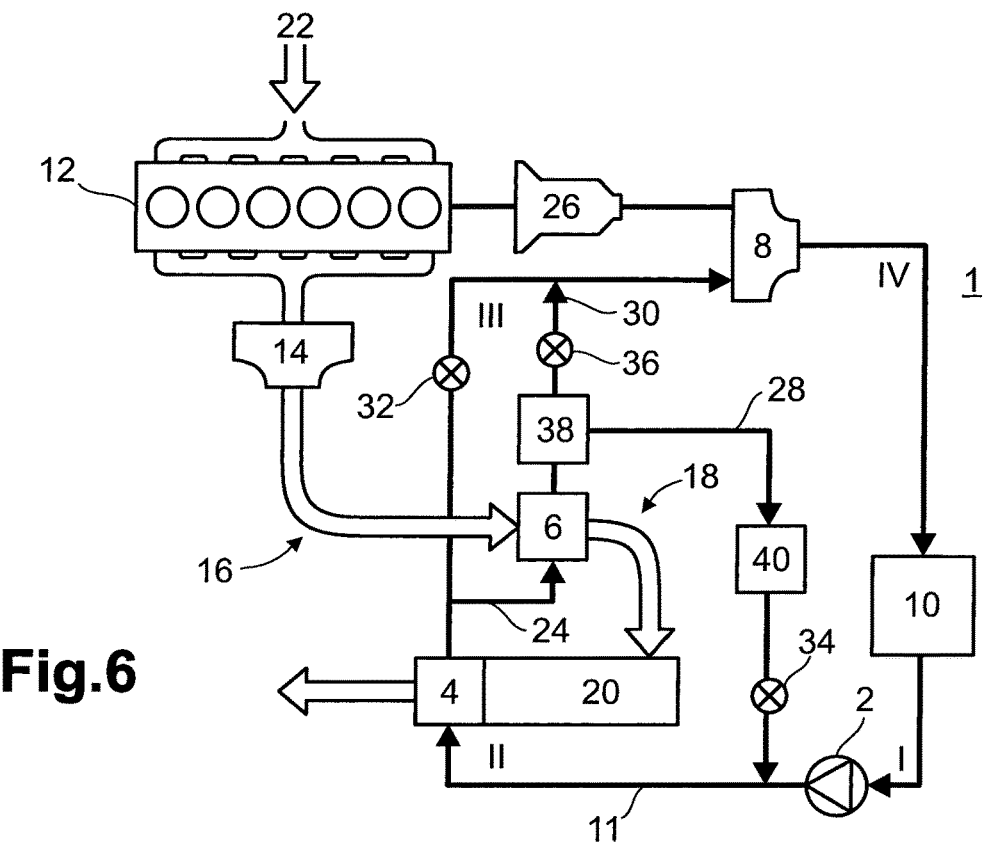
FIG. 6 a schematic illustration of a sixth embodiment of the present disclosure.

Since the working fluid which is guided through the first branch 28 is substantially liquid working fluid, and not a mixture, the first branch 28 may also be reconnected to the working fluid circulation circuit 11 downstream of condensation device 10. Thereby, it is particularly preferred to reconnect branch 28 downstream of the first pump 2, as depicted in FIG. 6. The working fluid streaming through the bypass passage 24, and further on through the first branch 28, may have a higher pressure than the working fluid leaving condensation device 10. It is therefore possible to use a second pump 40, which is arranged in the first branch 28 for pressurizing the working fluid to the pressure of the working fluid downstream of the first pump 2. Since the working fluid is streaming through the bypass passage 24 may have a higher pressure than the working fluid after the expander, the second pump 40 may be a less powerful pump than the first pump 2. Thereby, energy can be saved.

As mentioned above, the expander engine 8 may preferably be connected to the drivetrain 26 of a vehicle, thereby acting as auxiliary power unit. This has the disadvantage that no electric energy is produced by the exhaust gas arrangement. However, electric energy may be desirable for driving accessory equipment and saving the battery. Another use of the power from the expander engine 8 is thus to connect it with for example a generator which provides power to e.g. a battery or battery pack, which in turn may be used to run an electric motor in hybrid mode, or to run other accessories used in the vehicle 100.

Figure 7:
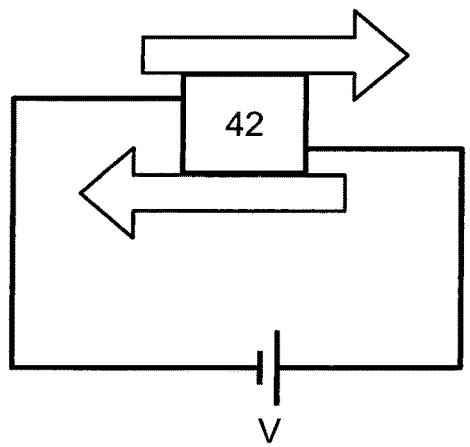
FIG. 7 a schematic illustration of a thermoelectric material for use in the present disclosure.

It has, as another alternative, been suggested to provide a thermoelectric material 42 in at least one of the heat exchangers. A schematic illustration of the thermoelectric material 42 is depicted in FIG. 7. The thermoelectric material 42 connects with its one side the exhaust gas duct 18 and with its other side the working fluid circulation circuit 11. Since usually the exhaust gas stream and the working fluid have different temperatures a potential difference V is induced, which may be used for operating a consumer or accessory.

The thermoelectric material 42 may be provided in the first and the second heat exchangers 4 and 6 and may generate electric energy for accessories e.g. when heat is transported from the exhaust gas stream to the working fluid or vice versa.

As mentioned above, it is also possible to supply electric energy to the thermoelectric material. This results therein that the thermoelectric material is heated at its one side and cooled on its other side. In the second heat exchanger 6, this effect can be used for heating the exhaust gas stream upstream of the exhaust gas treatment system 20 e.g. during a cold start, thereby bringing the exhaust gas treatment system 20 to its working temperature range, rapidly.

In the first heat exchanger 4, this effect may be used for beating the working fluid to a higher temperature than the exhaust gas stream leaving the exhaust gas treatment system 20. Subsequently, the additionally heated working fluid may provide heat in the second heat exchanger 6 to the exhaust gas upstream of the exhaust gas treatment system 20, whereby rapid cooling down of the exhaust gas treatment system 20 may be slowed down.

On the other hand, this effect may also be used for heating the exhaust gas treatment system 20 to a maximum temperature. Particularly, during a downhill course or during braking, where an alternator is used as auxiliary brake, the electric energy provided by the alternator during that process may be used for powering of the thermoelectric material 42. The resulting increase of exhaust gas stream temperature may in turn be used for superheating the working fluid. The thermal energy of the superheated working fluid may then be used for providing extra energy to the drivetrain of the vehicle as soon as the downhill drive or the breaking process has been stopped.

Besides the first and the second heat exchangers 4, 6, also the further EGR heat exchanger 7 may be equipped with a thermoelectric material 42. Thereby, the thermoelectric material 42 in the further EGR heat exchanger 7 may also be supplied with electric energy, which may be used for heating the exhaust gas stream recirculated to the EGR engine 12a. Thereby, it is possible to increase the temperature of the gas intake of the EGR engine 12 a, which results in a better combustion with lower emissions.

It should be noted that even if FIGS. 4 to 7 do not illustrate an EGR engine, the depicted embodiments of FIGS. 4 to 7 are also applicable to an EGR engine system as illustrated in FIG. 3.

On another note it should be mentioned that in the depicted embodiments it may according to general practice within the art be preferable to introduce valves and check valves also at other locations than the ones already included, such as valves 34 and 36. Examples of locations where valves for control of the flow of working fluid are advantageous are upstream and downstream of the first heat exchanger 4 in FIG. 3. Through such inclusion it is possible to control the amount of working fluid in each branch of the working fluid circulation circuit 11 during different operation modes of the internal combustion engine 2, 12a and of the vehicle 100. Such valves may be controlled e.g. by an Electronic Control Unit, ECU, in an otherwise known manner.

In summary, the present disclosure provides a possibility to keep the exhaust gas treatment system within its working temperature range during low load ICE operation modes, which gives a better overall efficiency. Particularly, the exhaust gas treatment system is kept warm during downhill driving, so it has full efficiency even at the end of a long downhill drive. Moreover, the hot exhaust gas treatment system provides a hot exhaust gas stream for vaporizing the working fluid and operating the expander engine, even during low load ICE operation modes. On the other hand, the bypass passage and heat exchanger may prevent the exhaust gas treatment system from superheating which prolongs the lifetime of the exhaust gas treatment system.

All this ensures that the heat recovery assembly may rapidly reproduce auxiliary power, even after long period of low load ICE operation mode. Consequently, thanks to the present disclosure the auxiliary power response time of the exhaust gas arrangement is increased, since heat is not first required for heating the exhaust gas treatment system. Also the efficiency of the exhaust gas treatment system is increased, as it is not cooled below its working temperature.

The invention claimed is:

1. An internal Combustion engine system, comprising:
an internal combustion engine configured to be operated in a plurality of different ICE operation modes,
an exhaust gas arrangement, comprising an exhaust gas system for conveying an exhaust gas stream, and
an electronic control unit (ECU) configured to control the exhaust gas arrangement based on a current ICE operation mode of the plurality of different ICE operation modes,
wherein the exhaust gas system comprises a turbine and an exhaust gas treatment system, wherein the exhaust gas arrangement further comprises a working fluid circulation circuit connected to the exhaust gas system for exchange of energy between the exhaust gas stream and a working fluid within the working fluid circulation circuit, wherein the working fluid circulation circuit comprises a first heat exchanger which is arranged at a waste heat source for exchange of energy between the waste heat source and the working fluid, and a second heat exchanger positioned in the exhaust gas system for exchange of energy between the exhaust gas stream and the working fluid, and wherein the second heat exchanger is positioned downstream of the turbine and upstream of a particle filter in the exhaust gas treatment system, and the second heat exchanger is operated based on the current ICE operation mode for controlling an operating temperature of the particle filter.

2. The internal combustion engine system according to claim 1, wherein the second heat exchanger is positioned upstream of any part of the exhaust gas treatment system.

3. The internal combustion engine system according to claim 1, wherein the waste heat source is any external or internal waste heat source.

4. The internal combustion engine system according to claim 3, wherein the waste heat source is the exhaust gas treatment system.

5. The internal combustion engine system according to claim 1, wherein the second heat exchanger is positioned upstream of the first heat exchanger.

6. The internal combustion engine system according to claim 5, wherein the first heat exchanger is positioned downstream of an SCR catalyst in the exhaust gas treatment system.

7. The internal combustion engine system according to claim 6, wherein the first heat exchanger is positioned downstream of any part of the exhaust gas treatment system.

8. The internal combustion engine system according to claim 1, wherein the working fluid circulation circuit comprises an expander engine arranged downstream of the first heat exchanger.

9. The internal combustion engine system according to claim 8, wherein a bypass passage is arranged in the working fluid circulation circuit for bypassing the expander engine, the bypass passage being branched off downstream of the first heat exchanger and is being reconnected to the working fluid circulation circuit downstream of the expander engine.

10. The internal combustion engine system according to claim 9, wherein the bypass passage is branched off upstream of the second heat exchanger.

11. The internal combustion engine system according to claim 1, wherein the working fluid circulation circuit further comprises a condensation device arranged downstream of the expander engine for condensing the working fluid, and a first for circulating the working fluid.

12. The internal combustion engine system according to claim 11, wherein the first pump is arranged downstream of the condensation device.

13. The internal combustion engine system according to claim 9, wherein the bypass passage is reconnected to the working fluid circulation circuit downstream of the condensation device.

14. The internal combustion engine system according to claim 13, wherein when the bypass passage is reconnected to the working fluid circulation circuit downstream of the condensation device the bypass passage is reconnected to the working fluid circulation circuit downstream of the first pump.

15. The internal combustion engine system according to claim 14, wherein a second pump is arranged in the bypass passage downstream of the second heat exchanger.

16. The internal combustion engine system according to claim 1, wherein a first valve is arranged in the working fluid circulation circuit downstream of the branch off of by the bypass passage and upstream of the expander engine for opening and/or closing the connection to the expander engine, and/or a second valve is arranged in the bypass passage for opening and/or closing the bypass passage.

17. The internal combustion engine system according to claim 1, wherein the bypass passage is split into at least a first branch and a second branch, wherein the first branch is arranged to reconnect the working fluid circulation circuit downstream of the expander engine, and the second branch is adapted to reconnect the working fluid circulation circuit upstream of the expander engine.

18. The internal combustion engine system according to claim 16, wherein the bypass passage is split into at least a first branch and a second branch, wherein the first branch is arranged to reconnect the working fluid circulation circuit downstream of the expander engine, and the second branch is adapted to reconnect the working fluid circulation circuit upstream of the expander engine, and wherein the second valve is arranged in the first branch for opening and/or closing the first branch, and a third valve is arranged in the second branch for opening and/or closing the second branch, and a third valve is arranged in the second branch for opening and/or closing the second branch.

19. The internal combustion engine system to claim 18, wherein the first and/or the second and/or the third valve is/are an on/off valve.

20. The internal combustion engine system according to claim 18, wherein the first valve is a normally open valve and/or the second and/or third valve is/are a normally closed valve.

21. The internal combustion engine system according to claim 16, wherein the bypass passage further comprises a separator arranged downstream of the second heat exchanger for separating the working fluid streaming through the bypass passage into a first stream of preferably liquid working fluid and a second stream of preferably gaseous working fluid.

22. The internal combustion engine system according to claim 21, wherein the separator is arranged at the location where the bypass passage branches into a first and second branch, so that the first stream of working fluid is guided through the first branch and the second stream of working fluid is guided through the second branch.

23. The internal combustion engine system according to claim 1, wherein the expander engine is adapted to be drivingly connected to a drivetrain of a vehicle.

24. The internal combustion engine system according to claim 1, wherein the expander engine is adapted to be drivingly connected to a generator of a vehicle.

25. The internal combustion engine system according to claim 1, wherein the arrangement further comprises a thermoelectric element for generating electric energy for driving a consumer, wherein the thermoelectric element comprises a thermoelectric material having a first side and a second side, wherein for generating electric energy, the temperature of the first side is adapted to differ from the temperature of second side, and/or wherein by supplying electric energy to the thermoelectric element, the temperature of the first side differs from the temperature of the second side.

26. The internal combustion engine system according to claim 25, wherein the first side is arranged in heat exchanging connection to the waste heat source.

27. The internal combustion engine system according to claim 25, wherein the second side is arranged in heat exchanging connection to the working fluid circulation circuit.

28. The internal combustion engine system according to claim 25, wherein the thermoelectric material is arranged in at least one of the heat exchangers.

29. The internal combustion engine system according to claim 25, wherein the thermoelectric material is arranged in the condensing device.

30. The internal combustion engine system according to claim 25, wherein the thermoelectric element is adapted to be powered by an external electric energy source.

31. A vehicle, comprising the internal combustion engine system according to claim 1.

* * * * *